UNITED STATES PATENT OFFICE.

LOUIS PROMOLI, OF TORONTO, ONTARIO, CANADA.

PROCESS FOR THE MANUFACTURE OF TERRO-METALLIC PAVING-STONES, &c.

SPECIFICATION forming part of Letters Patent No. 345,805, dated July 20, 1886.

Application filed May 16, 1885. Serial No. 165,752. (Specimens.) Patented in Canada February 27, 1882, No. 14,260.

*To all whom it may concern:*

Be it known that I, LOUIS PROMOLI, a subject of the Emperor of Germany, manufacturer, residing in the city of Toronto, in the county of York and Province of Ontario and Dominion of Canada, have invented certain new and useful Improvements in Process for the Manufacture of Terro-Metallic Paving-Stones or the like; and I do hereby declare that the following is a full, clear, and exact description of the invention, which will enable others skilled in the art to which it appertains to make and use the same.

My invention relates to a process for manufacturing paving-bricks, slabs, flags, curbstones, &c., the object being to provide a process by which articles of the character above mentioned may be manufactured out of common clay, which shall be extremely hard and durable and impermeable, and capable of resisting extreme heat, cold, or frost and moisture.

The process consists in the following steps: The clay is first well tempered with hot water and mixed, according to its more or less slimy natural constitution, with brick-powder or sand, so that the stones will be better able to resist the fire and to reduce the brittleness of the very hard-baked stone. After being well tempered for about twenty-four hours the clay is passed through a crushing-mill, in order to take out lime and all stones of a size exceeding that of an ordinary-sized marble, and to crush smaller stones to a powder, said crushing-mill mixing the clay and brick-powder well together before entering a pug-mill, which reduces the clay into a compact form and uniform mass, which is capable of being molded to the desired shape by the workman who removes it from the mill, or being molded by the pug-mill itself by means of a self-acting press apparatus pressing the mass into mold-boxes. Having first covered the molds or the clay molded with ordinary brick or tile powder, the molded bricks are then placed in a drying-room and left to remain there for two or three days, at the expiration of which time they are placed in molds of the desired shape, and submitted to great pressure under a hydraulic screw or other press. The stones are then perfectly dry, and are placed into a furnace, and allowed to remain there for about five or six days, after which they may be removed, and when cool are ready for use.

Articles of the character mentioned, produced by the process described, are extremely hard and durable, are not effected by heat, cold, or moisture, may be manufactured and supplied at a slight cost, and are much superior to the ordinary brick in appearance.

I am aware that in the manufacture of bricks, &c., clay has been first crushed and pulverized, previous to which pebbles and small stones have been separated from it, moistened by steam, being stirred or otherwise agitated, then molded, (the molds being sanded,) and then pressed; but I am not aware that clay has been crushed with the pebbles and small stones; nor am I aware that at this stage of the process the mass has been treated with brick-powder and run through a pug-mill, the powder rendering the stones better capable of standing the fire and to reduce the brittleness of the stones when baked; nor am I aware that the mass has been subjected to a pug-mill to reduce the clay to a uniform and compact mass; neither am I aware that the bricks after molding are placed in a drying-room and again placed in molds and subjected to great pressure, and then burning them.

I claim as my invention and desire to secure by Letters Patent—

The herein-described process, consisting of the following steps: first, tempering the clay with hot water and adding brick-powder or sand thereto; second, crushing and thoroughly mixing the mass; third, subjecting the substance to the action of a pug-mill; fourth, molding to the desired shape; fifth, drying the same in a drying-room for three or four days; sixth, again placing the articles in molds and subjecting them to great pressure, and, finally, burning the articles.

In testimony whereof I affix my signature in presence of three witnesses.

LOUIS PROMOLI.

Witnesses:
   G. PETER HEIMROD,
     *Imperial German Consul.*
   WILLIAM MITCHELL,
   W. H. BEATTY.